(12) United States Patent
Kimura

(10) Patent No.: US 11,496,668 B2
(45) Date of Patent: Nov. 8, 2022

(54) IMAGE CAPTURE APPARATUS AND CONTROL METHOD THEREOF

(71) Applicant: CANON KABUSHIKI KAISHA, Tokyo (JP)

(72) Inventor: Masafumi Kimura, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/944,533

(22) Filed: Jul. 31, 2020

(65) Prior Publication Data
US 2021/0051265 A1 Feb. 18, 2021

(30) Foreign Application Priority Data

Aug. 16, 2019 (JP) .............................. JP2019-149407

(51) Int. Cl.
| | |
|---|---|
| *H04N 5/232* | (2006.01) |
| *G06T 7/70* | (2017.01) |
| *H04N 5/222* | (2006.01) |
| *G06V 40/18* | (2022.01) |

(52) U.S. Cl.
CPC .......... *H04N 5/23218* (2018.08); *G06T 7/70* (2017.01); *G06V 40/197* (2022.01); *H04N 5/222* (2013.01); *H04N 5/23216* (2013.01); *G06T 2207/30201* (2013.01)

(58) Field of Classification Search
CPC . G06T 2207/30201; G06T 2207/30196; G06T 7/70; G06T 2207/10048; G06T 7/73; G06K 9/00302; G06K 9/00335; G06K 9/00362; G06K 9/00671; G06K 9/6201; H04N 5/23218; H04N 5/222; H04N 5/23216; H04N 5/232122; H04N 5/2351; H04N 5/2353; H04N 5/238; H04N 5/232; G06V 40/197; G06V 10/82; G06V 10/443; G06V 20/10; G06V 20/52; G06V 30/242

See application file for complete search history.

(56) References Cited

U.S. PATENT DOCUMENTS

| | | | | |
|---|---|---|---|---|
| 2004/0220704 | A1* | 11/2004 | Lin ........................ | G06F 3/013 701/1 |
| 2008/0127248 | A1* | 5/2008 | Lin ..................... | H04N 21/8146 725/32 |
| 2011/0194732 | A1* | 8/2011 | Tsuji .................. | G06K 9/00288 382/103 |
| 2013/0136304 | A1* | 5/2013 | Anabuki ............ | G06K 9/00362 382/103 |
| 2015/0145956 | A1* | 5/2015 | Hayakawa ......... | G06K 9/00791 348/46 |

(Continued)

FOREIGN PATENT DOCUMENTS

| | | |
|---|---|---|
| JP | H08-504979 T | 5/1996 |
| JP | 2002-303781 A | 10/2002 |
| WO | 94/09446 A | 4/1994 |

*Primary Examiner* — Paulos M Natnael
(74) *Attorney, Agent, or Firm* — Carter, DeLuca & Farrell LLP

(57) ABSTRACT

An image capture apparatus detects a subject in a captured image. The image capture apparatus further recognizes its user based on an eyeball image of the user. The image capture apparatus then selects a main subject area from among the detected subject areas, based on information regarding subjects captured in the past and stored being associated with the recognized user.

13 Claims, 13 Drawing Sheets

(56) References Cited

U.S. PATENT DOCUMENTS

2018/0173949 A1\* 6/2018 Jeong ................. G06K 9/00255
2018/0303667 A1\* 10/2018 Peyman ................. A61B 34/35
2019/0026589 A1\* 1/2019 Sugihara .............. G06K 9/3241
2019/0083335 A1\* 3/2019 Zhang ................. A61G 5/1051

\* cited by examiner

IMAGE CAPTURE APPARATUS AND CONTROL METHOD THEREOF

BACKGROUND OF THE INVENTION

Field of the Invention

The present invention relates to an image capture apparatus and a control method thereof, and specifically relates to an image capture apparatus having a line of sight detection function and a control method thereof.

Description of the Related Art

A camera having a line of sight detection function in which a focus detection area can be selected by line-of-sight (Los) input (also referred to as "eye-controlled AF") is known (Japanese Patent Laid-Open No. 2002-303781).

When the line of sight is detected using an eyeball image of a user, it is possible to recognize the user using an iris pattern obtained from the eyeball image. However, in a known technique, the result of recognizing a user is merely used for correcting line of sight detection accuracy, which is degraded due to individual difference.

SUMMARY OF THE INVENTION

The present invention has been made in view of the problems described above, and provides an image capture apparatus that can support selection of a main subject using a result of recognizing a user using a line of sight detection function, and a control method thereof.

According to an aspect of the present invention, there is provided an image capture apparatus comprising: one or more processors, when executing a program stored in a memory, function as: a subject detection unit configured to perform subject detection processing on a captured image; a recognition unit configured to recognize a user of the image capture apparatus based on an eyeball image of the user; and a selection unit configured to select a main subject area from subject areas detected by the subject detection unit, based on information stored being associated with the user recognized by the recognition unit, out of information regarding subjects captured in the past and stored being associated with users.

According to another aspect of the present invention, there is provided an image capture apparatus comprising: one or more processors, when executing a program stored in a memory, function as: a recognition unit configured to recognize a user looking into a display unit that displays an image, from an eyeball image of the user; a selection unit configured to select a main subject area from the image, based on a result of subject detection processing performed on the image and information regarding subjects captured by the recognized user in the past and being stored in association with the user; and a notification unit configured to notify the user of the main subject area through the display unit.

According to a further aspect of the present invention, there is provided a control method of an image capture apparatus, comprising: performing subject detection processing on a captured image; recognizing a user of the image capture apparatus based on an eyeball image of the user; and selecting a main subject area from subject areas detected by the subject detection unit, based on information stored being associated with the user recognized in the recognizing, out of information regarding subjects captured in the past and stored being associated with user.

According to another aspect of the present invention, there is provided a non-transitory computer-readable medium storing a program for causing a computer included in an image capture apparatus to function as a subject detection unit configured to perform subject detection processing on a captured image; a recognition unit configured to recognize a user of the image capture apparatus based on an eyeball image of the user; and a selection unit configured to select a main subject area from subject areas detected by the subject detection unit, based on information stored being associated with the user recognized by the recognition unit, out of information regarding subjects captured in the past and stored being associated with users.

Further features of the present invention will become apparent from the following description of exemplary embodiments (with reference to the attached drawings).

DESCRIPTION OF THE EMBODIMENTS

Figure 1:
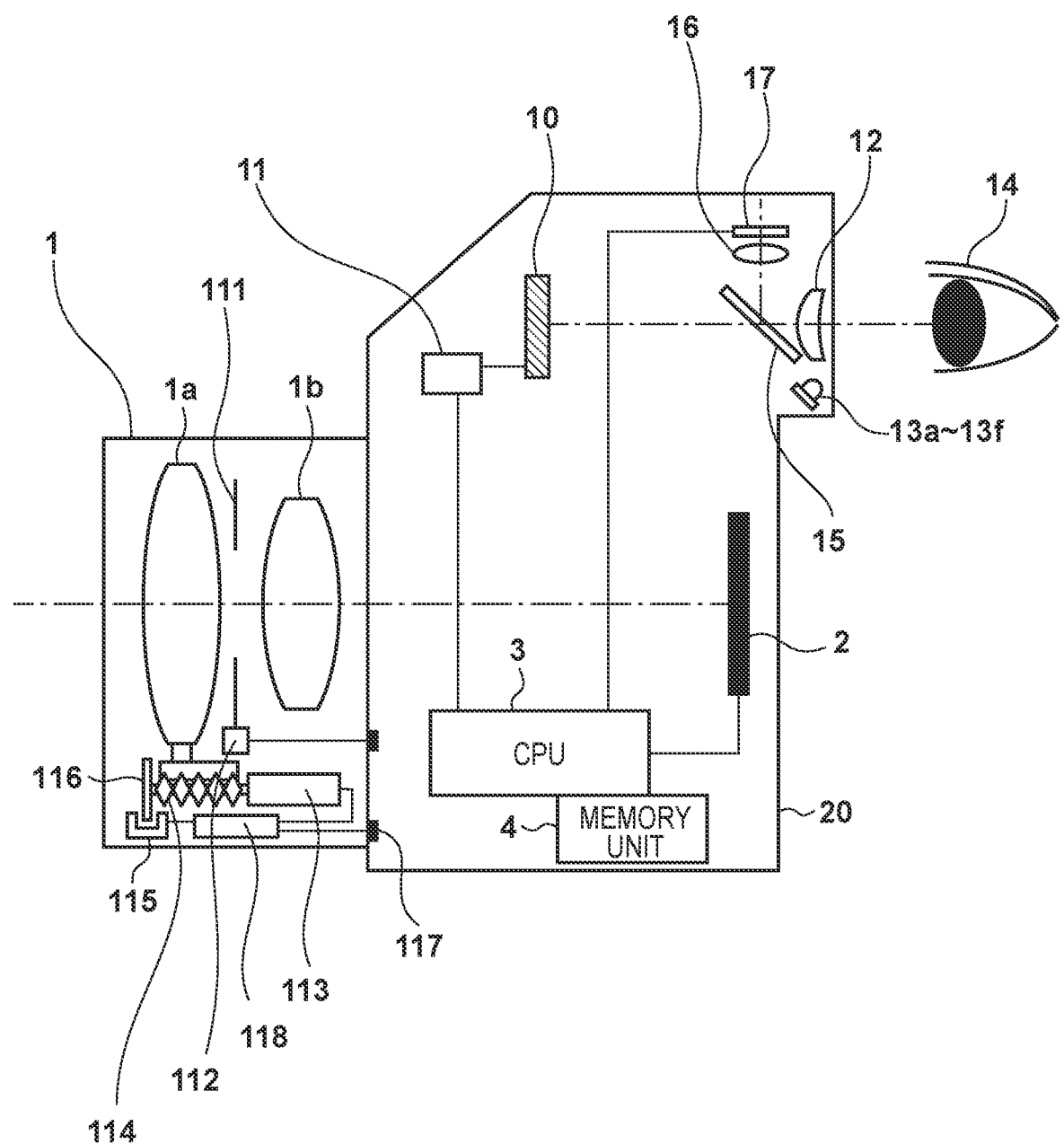
FIG. 1 is a diagram relating to an exemplary configuration of an image capture apparatus that can implement the present invention.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

Note that, in the following embodiment, a case where the present invention is implemented in an interchangeable lens type digital camera will be described. However, the present invention can be applied to any electronic device in which a line of sight detection function and an image capture function can be installed. Such electronic devices include a video camera, a computer device (such as a personal computer, a tablet computer, a media player, or a PDA), a mobile phone, a smart phone, a game machine, a robot, a drone, a drive recorder, and the like. However, these are merely examples, and the present invention can also be applied to other electronic devices. Also, the present invention can also be applied to a configuration in which the line of sight detection function and the image capture function are respectively installed on separate devices (e.g., a main body and a remote controller) that can communicate to each other.

First Embodiment

Description of Configuration

FIG. 1 is a vertical cross-sectional view schematically illustrating an exemplary configuration, mainly an optical system, of a digital still camera (hereinafter, simply referred to as a camera) according to an embodiment. The camera includes a main body 20 and an imaging lens 1 that can be attached to and detached from the main body 20. Note that the interchangeable lens type is not essential to the present invention. When the imaging lens 1 is attached to the main body 20, the imaging lens 1 and the main body 20 are electrically connected through a mount contact 117. Power is supplied to the imaging lens 1 from the main body 20 through the mount contact 117. Also, circuits inside the imaging lens 1 and a CPU 3 of the main body 20 can communicate to each other through the mount contact 117.

The imaging lens 1 includes a movable lens 1a and a fixed lens 1b. These lenses are each illustrated as one lens in the diagram, but in actuality are each constituted by a plurality of lenses. Here, the movable lens 1a is assumed to be a focus lens, but may include other movable lenses such as a variable magnification lens and a blur correction lens. The movable lens 1a is supported by a lens drive member 114, and is driven in an optical axis direction (left and right direction in the diagram) by a lens drive motor 113. The rotation of a pulse plate 116 that rotates along with the lens drive member 114 is detected by a photocoupler 115, and the detected result is output to a lens focus adjustment circuit 118. The lens focus adjustment circuit 118 can detect the drive amount and the drive direction of the movable lens 1a based on the output of the photocoupler 115. The lens focus adjustment circuit 118, upon being received an instruction regarding the drive amount and drive direction of the movable lens 1a from the CPU 3 of the main body 20, controls the operation of the lens drive motor 113 based on the output of the photocoupler 115.

In a camera main body 20, an image sensor 2 is a CCD image sensor or a CMOS image sensor. A plurality of pixels are arranged two-dimensionally in the image sensor 2, and each pixel is provided with one micro lens, one color filter, and at least one photoelectric conversion portion. In the present embodiment, each pixel is provided with a plurality of photoelectric conversion portions, and is configured such that a signal can be read out from each photoelectric conversion portion. As a result of the pixel being configured in this way, a captured image, a parallax image pair, and image signals for a phase difference AF can be generated from signals read out from the image sensor 22. The image sensor 2 converts an optical image formed by the imaging lens 1 to a pixel signal group (analog image signal) by the plurality of pixels performing photoelectric conversion. Also, in the present embodiment, the image sensor 2 has an A/D conversion function, converts an analog image signal to digital image data, and outputs the digital image data.

A memory unit 4 includes a nonvolatile memory (ROM) and a volatile memory (RAM). The CPU 3 loads a program stored in a ROM to a RAM, and executes the program, and as a result, the CPU 3 controls the operations of the main body 20 and the imaging lens 1, and realizes the camera functions. Also, the memory unit 4 also includes a storage medium (such as a memory card) for recording image data and sound data that are obtained by capturing. The CPU 3 controls the operations of the lens focus adjustment circuit 118 and an aperture drive unit 112 through the mount contact 117.

The nonvolatile memory in the memory unit 4 may be rewritable. The nonvolatile memory stores programs to be executed by the CPU 3, various setting values, image data for GUI (Graphical User Interface), line of sight correction data for correcting an individual difference of the line of sight, and the like. Also, an iris pattern and personal or individual information are stored in the nonvolatile memory in an associated manner.

The display device 10 is an LCD or an organic EL display panel, and displays a captured image such as a live view image, a menu screen, various types of information, and the like. A display device drive circuit 11 drives the display device 10 in accordance with the control of the CPU 3. Because the display device 10 is provided inside the main body 20, an eyepiece unit for observing the display device 10 from the outside of the main body 20 is provided. The eyepiece unit is provided with an eyepiece lens 12 and light sources 13a to 13f for detecting the line of sight. Also, the eyepiece unit is provided with an optical divider 15 and an eyeball image sensor 17 for capturing an eyeball image.

The light sources 13a to 13f are a plurality of infrared LEDs provided so as to surround the eyepiece lens 12, and illuminate the eyeball 14 of a user who looks through the eyepiece unit with infrared light. An eyeball image obtained by the infrared light of the light sources 13a to 13f being reflected on the eyeball 14, is reflected by the optical divider 15, and is captured by the eyeball image sensor 17 through a light receiving lens 16 that is provided upward of the optical divider 15. The light receiving lens 16 places the eyeball image sensor 17 to be in a conjugate imaging relationship with the pupil of the user's eyeball 14. The eyeball image sensor 17 includes a plurality of pixels that are arranged two-dimensionally, and is configured to capture an infrared light image. The number of pixels of the eyeball image sensor 17 may be smaller than the number of pixels of the image sensor 2. The line of sight direction of the eyeball 14 can be detected based on the positional relationship between cornea reflection and the pupil in an eyeball image obtained by the eyeball image sensor 17.

The light sources 13a to 13f, the optical divider 15, the light receiving lens 16, the eyeball image sensor 17, CPU 3, and a line of sight detection circuit 201, which will be described later, constitute a line of sight detection apparatus. The CPU 3 further functions as user recognition means for specifying a user based on an iris pattern in the eyeball image and stored iris patterns.

Figure 2:
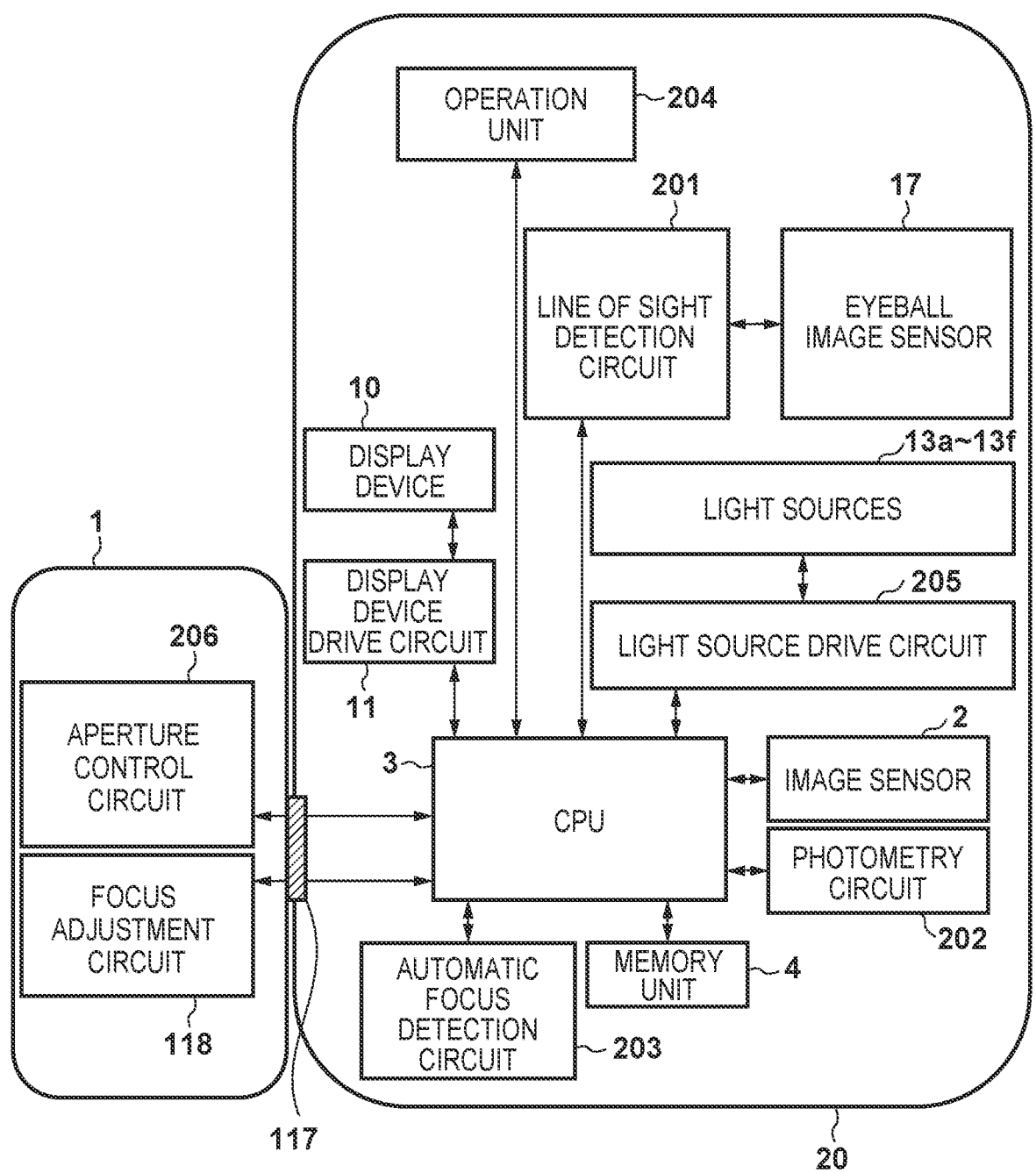
FIG. 2 is a diagram relating to an exemplary configuration of the image capture apparatus that can implement the present invention.

FIG. 2 is a block diagram of an exemplary configuration of the camera of the present embodiment, which is illustrated focusing on electric circuits. The constituent elements shown in FIG. 1 are given the same reference numerals as those in FIG. 1. The line of sight detection circuit 201, a photometry circuit 202, an automatic focus detection circuit 203, an operation unit 204, the display device drive circuit 11, an light source drive circuit 205 are connected to the CPU 3. Also, the focus adjustment circuit 118 and an aperture control circuit 206 (included in the aperture drive unit 112) that are provided in the imaging lens 1 are electrically connected to the CPU 3 through the mount contact 117.

The line of sight detection circuit 201 A/D-converts an analog image signal of an eyeball image obtained from the eyeball image sensor 17 (CCD-EYE), and transmits the resultant digital image data to the CPU 3. The CPU 3 detects characteristic points needed for line of sight detection from the digital image data of an eyeball image following a known algorithm, and detects the line of sight direction of the user from the positions of the characteristic points.

The photometry circuit 202 generates luminance information, which is an evaluation value for predetermined exposure control, based on image data obtained from the image sensor 2, and outputs the luminance information to the CPU 3. The CPU 3 performs automatic exposure control (AE) processing based on the luminance information, and determines the capturing condition. The capturing condition includes, in the case of still image capturing, a shutter speed, an f-number, and an ISO speed, for example. The CPU 3 controls the f-number (aperture diameter) of an aperture 111 of the imaging lens 1 based on the determined capturing condition. Also, the CPU 3 also controls the operation of a mechanical shutter inside the main body 20.

The automatic focus detection circuit 203 generates image signals for phase difference AF based on image data obtained from the image sensor 2, and outputs the image signals to the CPU 3. The CPU 3 calculates the defocus amount based on the phase difference between the image signals for phase difference AF. This is a known technique known as imaging plane phase difference AF. In the present embodiment, it is assumed that there are 180 focus detection points at locations on the imaging plane corresponding to positions shown in viewfinder visual field images of FIGS. 3A to 3C, which will be described later, as an example, but there is no limitation thereto.

The operation unit 204 includes a plurality of input devices (such as a button, a switch, and a dial) that can be operated by the user. Some of the input devices included in the operation unit 204 have names corresponding to assigned functions, and there are a shutter button, a power switch, a menu button, a direction key, a determination button, and the like, as representative examples. The operations made on the input devices included in the operation unit 204 are monitored by the CPU 3. The CPU 3, upon detecting an operation made on an input device, executes processing corresponding to the detected operation.

The shutter button includes a first shutter switch (SW1) that is turned on when entering a half-pressed state, and a second shutter switch (SW2) that is turned on when entering a fully-pressed state. The CPU 3, upon detecting that SW1 is turned on, executes a preparatory operation of still image capturing. The preparatory operation includes AE processing, AF processing, and the like. Also, the CPU 3, upon detecting that SW2 is turned on, executes capturing and recording operations of a still image in accordance with the capturing conditions determined in the AE processing.

The light source drive circuit 205 controls a light emitting operation of the light sources 13a to 13f under the control of the CPU 3.

Figure 3A:
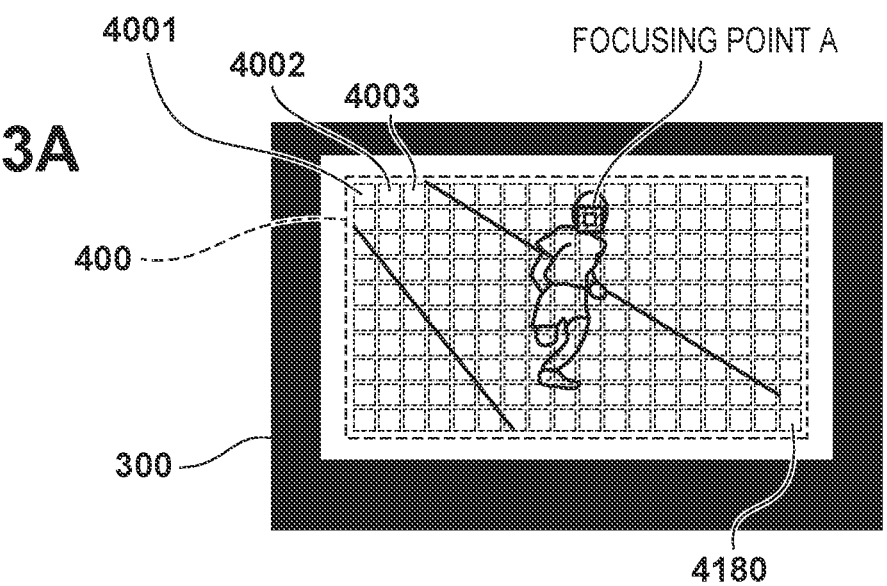
FIGS. 3A to 3C are schematic diagrams illustrating an example of a viewfinder visual field in an embodiment.
Figure 3B:
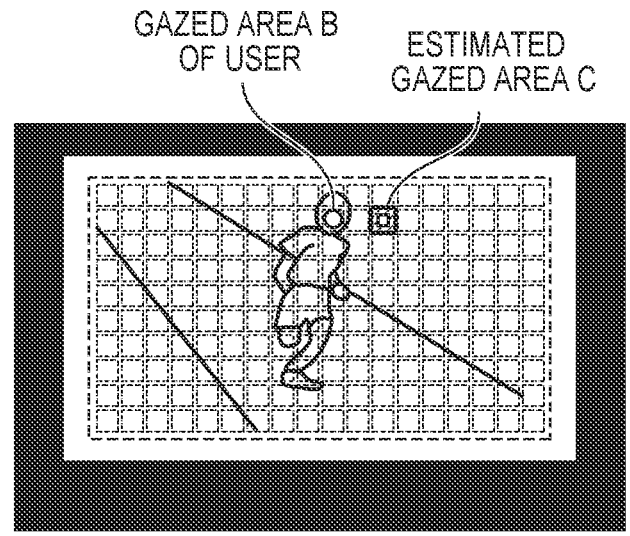
Figure 3C:
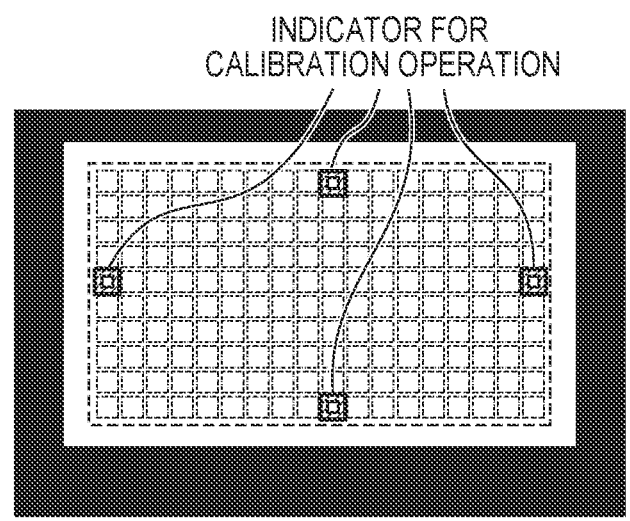

FIGS. 3A to 3C are each a diagram illustrating an example of a visual field (viewfinder visual field) observed through the eyepiece lens 12, and here, show a state in which a live view image on which various indicators are superimposed is displayed in the display device 10.

In FIGS. 3A to 3C, 300 denotes a visual field mask, 400 denotes an indicator indicating a range in which focus detection is possible, and 4001 to 4180 denote 180 indicators displayed at positions corresponding to points (focus detection point) at which focus detection is possible. Also, the indicator, of the indicators of focus detection points, corresponding to a current focus detection area is highlighted so as to be shown as a focusing point A in FIG. 3A.

Description of Line of Sight Detection Operation

The line of sight detection operation will be described using FIGS. 4 to 6.

Figure 4:
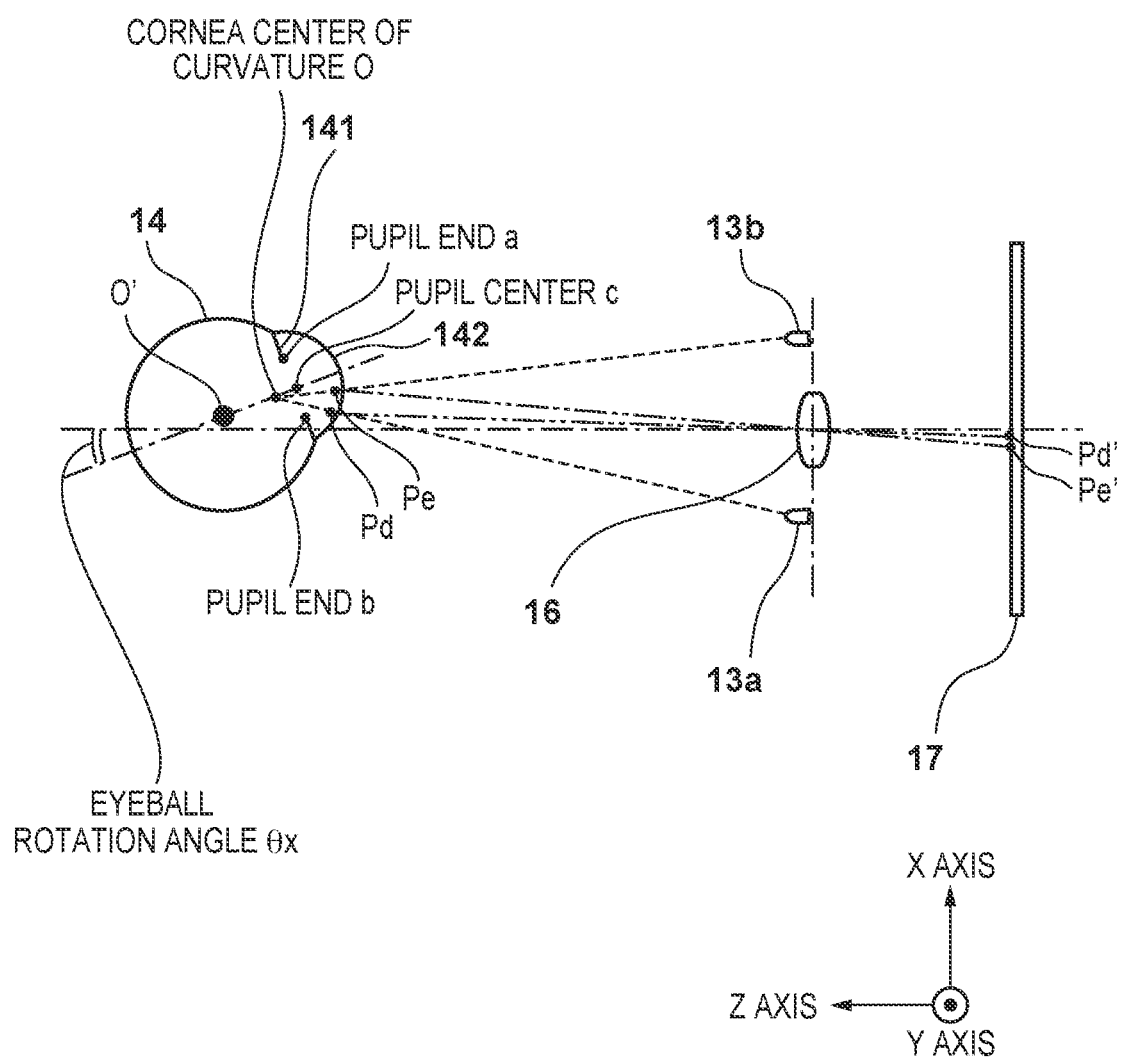
FIG. 4 is a diagram relating to a line of sight detection method in the embodiment.

FIG. 4 is a diagram relating to the principle of line of sight detection, and the same constituent elements as those in FIG. 1 are given the same reference numerals. The light sources 13a to 13f are arranged substantially symmetrically relative to an optical axis of the light receiving lens 16, and emit infrared light to an eyeball 14 of the user. In FIG. 4, only the light sources 13a and 13b are illustrated. The light receiving lens 16 forms an eyeball image by infrared light reflected on the eyeball 14 on an imaging plane of the eyeball image sensor 17.

Figure 5A:
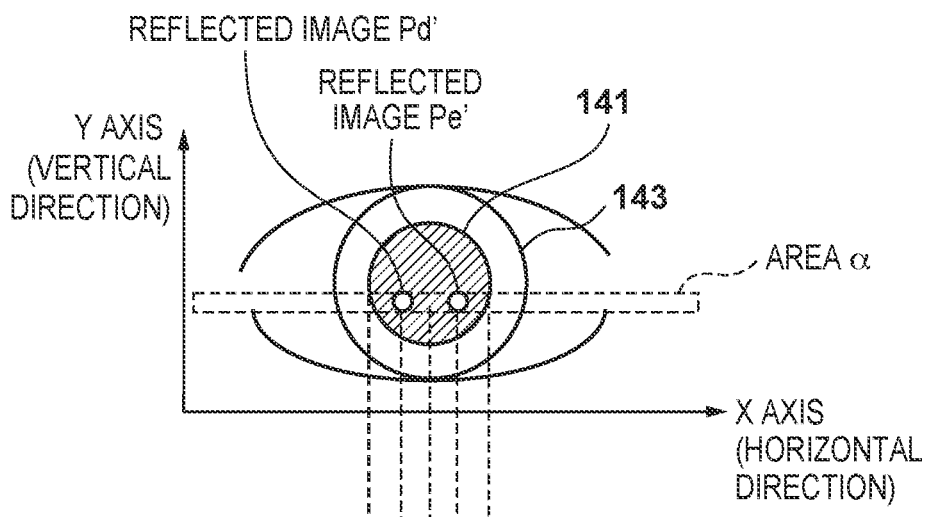
FIGS. 5A to 5C are diagrams relating to an eyeball image that can be obtained in the embodiment.
Figure 5B:
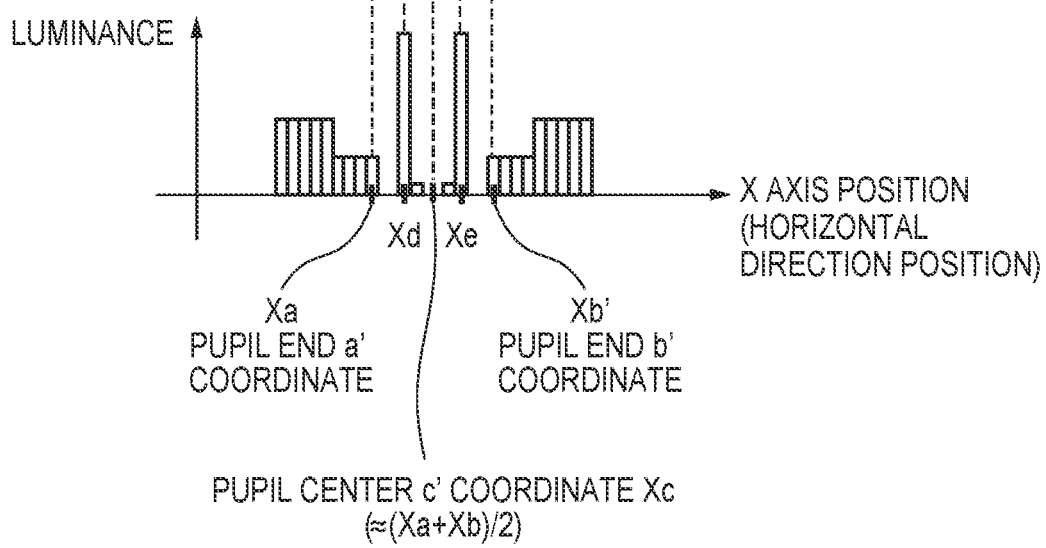

FIG. 5A is a schematic diagram of an eyeball image formed by the light receiving lens, and FIG. 5B is a schematic diagram of luminance distribution in an area a in FIG. 5A.

Figure 6:
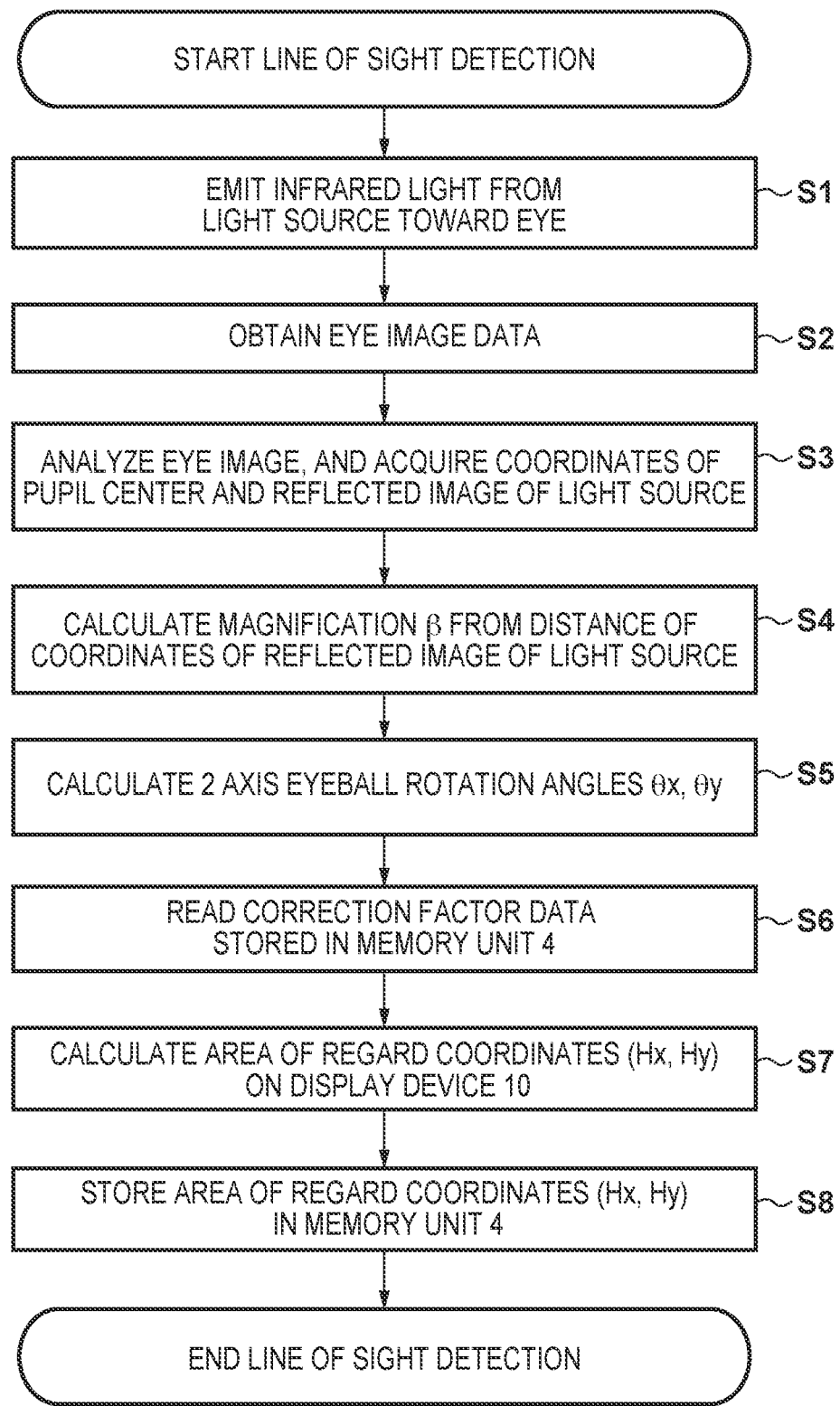
FIG. 6 is a flowchart relating to a line of sight detection operation in the embodiment.

FIG. 6 is a flowchart relating to a line of sight detection operation. The line of sight detection operation can be executed when it is detected that an object is close to the eyepiece lens 12. The fact that an object is close to the eyepiece lens 12 can be detected using any known method such as a method using a proximity sensor provided in the vicinity of the eyepiece lens 12, for example. The line of sight detection operation may also be started in response to a user instruction through the operation unit 204.

In step S1, the CPU 3 turns on at least one of the light sources 13a to 13f through the light source drive circuit 205. Here, the light sources 13a and 13b shown in FIG. 4 are assumed to be turned on, for convenience. With this, the light sources 13a and 13b emit infrared light toward the outside of the main body 20. The infrared light is reflected on an eyeball of the user who looks through the eyepiece lens 12, is further reflected by the optical divider 15, and enters the light receiving lens 16.

In step S2, the CPU 3 performs capturing using the eyeball image sensor 17. The eyeball image sensor 17 converts the eyeball image formed by the light receiving lens 16 to an image signal. The line of sight detection circuit 201 A/D-converts the image signal, and inputs the conversion result to the CPU 3 as eyeball image data.

In step S3, the CPU 3 obtains, from the eyeball image data acquired in step S2, the coordinates of cornea reflection images Pd' and Pe' of the light sources 13a and 13b and the coordinates of a point corresponding to a pupil center c. The eyeball image obtained by the eyeball image sensor 17 includes the reflection images Pd' and Pe' corresponding to images Pd and Pe of the light sources 13a and 13b projected on the cornea 142 (FIG. 5A).

As shown in FIG. 5A, the horizontal direction is defined as an X axis, and the vertical direction is defined as a Y axis. Here, the X-axis coordinates of centers of the reflection images Pd' and Pe' of the light sources 13a and 13b included in the eyeball image are respectively denoted as Xd and Xe. Also, the X-axis coordinates of images a' and b' of pupil ends a and b, which are end portions of a pupil 14b are respectively denoted as Xa and Xb.

As shown in FIG. 5B, the luminances at coordinates Xd and Xe corresponding to the reflection images Pd' and Pe' of the light sources 13a and 13b are substantially higher than the luminances at other positions. On the other hand, the luminances in a range from the coordinate Xa to the coordinate Xb corresponding to an area of the pupil 141 become substantially low other than the luminances at coordinates Xd and Xe. Also, in the range corresponding to an iris 143 outside the pupil 141, that is, the range in which the coordinate is smaller than Xa and the range in which the coordinate is larger than Xb, the luminance is a luminance between the luminance of the reflection images of the light sources and the luminance of the pupil.

Based on such luminance level characteristics in the X axis direction, the CPU 3 can detect, from the eyeball image, the X-axis coordinates Xd and Xe of the reflection images Pd' and Pe' of the light sources 13a and 13b and the X-axis coordinates Xa and Xb of the images a' and b' of the pupil ends a and b. Also, in the application as in the present embodiment, the rotation angle θx of the optical axis of the eyeball 14 relative to the optical axis of the light receiving lens 16 is relatively small. In such a case, the X-axis coordinate Xc of an image c' of a pupil center c in the eyeball image can be expressed as Xc≈(Xa+Xb)/2. In this way, the CPU 3 can obtain, from the eyeball image, the coordinates of the cornea reflection images Pd' and Pe' of the light sources 13a and 13b and the X-axis coordinate of the image c' of the pupil center c.

Next, in step S4, the CPU 3 calculates an image forming magnification β of the eyeball image. β is a magnification determined by the position of the eyeball 14 relative to the light receiving lens 16, and can be obtained as a function of the distance (Xd−Xe) between the reflection images Pd' and Pe' of the light sources.

Also, in step S5, the CPU 3 calculates a rotation angle of the eyeball. The X-axis coordinate of a middle point of the images Pd and Pe of the light sources on the cornea 142 substantially matches the X-axis coordinate of a center of curvature O of the cornea 142. Therefore, when the standard distance from the center of curvature O of the cornea 142 to the center c of the pupil 141 is denoted as Oc, the rotation angle θx of the optical axis of the eyeball 14 in a Z-X plane can be obtained from the following relational expression.

$$\beta * Oc * \text{SIN } \theta x \approx \{(Xd+Xe)/2\} - Xc$$

In FIGS. 4 and 5A to 5C, an example is illustrated in which the rotation angle θx in a plane perpendicular to the Y axis is calculated, but a rotation angle θy in a plane perpendicular to the X axis can also be similarly calculated. In this way, the CPU 3 obtains the rotation angles θx and θy of the eyeball. The line of sight direction can be specified from the rotation angles of the eyeball.

In step S6, the CPU 3 acquires a line of sight correction factor from the memory unit 4. The line of sight correction factor is a factor for correcting the individual difference of the user regarding the line of sight. The line of sight correction factor is generated by a calibration operation, which will be described later, and is stored in the memory unit 4 before the line of sight detection operation is started. In the present embodiment, the CPU 3 generates a code indicating an iris pattern from the eyeball image, and can acquire the line of sight correction factor for the user from the memory unit 4 based on the code. The recognition of a user based on the iris pattern will be described later.

In step S7, the CPU 3 obtains a position of a point, on the display device 10, at which the user gazes (which can also be said as a position in the image at which the user gazes) using the rotation angles θx and θy of the eyeball obtained in step S5. Note that, in actuality, the line of sight fluctuates slightly, and it is not easy to strictly specify one point, and therefore a term "gazed area" is used in place of "point of regard" in the following. Also, the coordinates of the gazed area are coordinates that represent the area such as central coordinates. The coordinates of the gazed area can be calculated as follows, which are coordinates (Hx, Hy), on the display device 10, of a point corresponding to the center c of the pupil 141.

$$Hx=m\times(Ax\times\theta x+Bx)$$

$$Hy=m\times(Ay\times\theta y+By)$$

Here, the factor m is a conversion factor for converting the rotation angles θx and θy to position coordinates corresponding to the center c of the pupil 141 on the display device 10, and is determined based on the configuration of the viewfinder optical system of a camera. The factor m can be stored in the memory unit 4 in advance. Also, Ax, Bx, Ay, and By are line of sight correction factors acquired in step S6.

In step S8, the CPU 3 stores the gazed area coordinates (Hx, Hy) calculated in step S7 to the memory unit 4, and ends the line of sight detection operation. Note that the line of sight detection operation is repeatedly executed, and the gazed area coordinates are sequentially updated. Time series data of the gazed area coordinates for a latest fixed time period may be held in the memory unit 4.

Here, an example has been described in which the gazed area coordinates are detected based on the positions of reflection images of the light sources 13a and 13b and the position of the pupil image. However, the gazed area coordinates can be detected using any known method for acquiring an eyeball rotation angle from a captured eyeball image.

Calibration Operation

In order to accurately obtain the gazed area coordinates from the rotation angle of the eyeball, the individual difference needs to be corrected. When the individual difference is not corrected, a shift occurs between the position at which the user actually gazes and the detected gazed area coordinates, and a position different from the position intended by the user is recognized by the camera. For example, in the example shown in FIG. 3B, in contrast to a gazed area B of the user, the camera calculates (estimates) a different gazed area C.

Therefore, the calibration operation is performed, and the line of sight correction factor for each user is generated and stored in the memory unit 4. In the calibration operation, a plurality of indicators whose positions are different are highlighted, as shown in FIG. 3C, and the gazed area coordinates regarding the respective indicators are acquired by executing the line of sight detection operation while causing the user to gaze one each of the highlighted indicators. The line of sight correction factor is obtained based on the difference between the acquired gazed area coordinates and the actual indicator position. The calibration operation of such an LoS input is a known technique, and therefore more detailed description will be omitted.

Figure 5C:
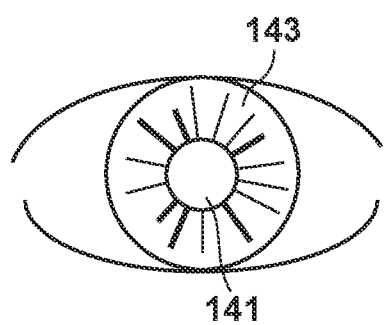

The camera of the present embodiment has a function of identifying a user using an iris pattern acquired from the eyeball image that is acquired for line of sight detection. An eyeball image such as shown in FIG. 5A can be obtained from the eyeball image sensor 17. FIG. 5C is a diagram illustrating the eyeball image shown in FIG. 5A while focusing on the iris 143. The iris 143 has muscles for changing the size of the pupil 141, and wrinkles are formed at a stage of forming the eyeball. In FIG. 5C, these wrinkles are shown as lines that radially extend. Because the wrinkles differ for each person, the wrinkles can be used as bio-information with which a person can be identified similarly to a fingerprint and the like.

The CPU 3 can encode the iris pattern obtained from the eyeball image using a known technique such as that described in Japanese Patent Laid-Open No. 8-504979, for example, and the code can be stored in the memory unit 4 in association with the line of sight correction factor. As a result of comparing the code obtained from the eyeball image obtained in the line of sight detection operation with the codes stored in the memory unit 4, the CPU 3 can specify the user. If a code obtained from the eyeball image is not stored in the memory unit 4, the CPU 3 can add the code to the memory unit 4. As a result of specifying the user by means of an iris pattern using a configuration for line of sight detection, the CPU 3 can acquire a line of sight correction factor appropriate for the user from the memory unit 4, without requiring a user operation. Also, as a result of storing subject information for each user in an associated manner, which will be described later, the possibility that the camera can select a main subject that is highly likely to match the user intention can be increased.

Figure 7:
FIG. 7 is a diagram illustrating an effect of the invention.

An example of a scene in which the present invention is effective will be described using FIG. 7. FIG. 7 schematically shows a capturing scene near the goal of a footrace, and shows a case where there are a front player 501 and a back player 502, and a gazed area 503 is present in the vicinity of the boundary.

The CPU 3 applies various types of image processing on an image read out from the image sensor 2, and subject detection processing is included as one of the types of image processing. The subject detection processing is processing for detecting an area in which a subject of a predetermined type (e.g., a flower, a person, or a railway) is considered to be captured, using edge detection, pattern matching, a trained neural network, or the like. Also, personal identification processing for identifying a specific person based on a face feature or the like is included in the subject detection processing. The data used for such subject detection processing (data indicating a feature corresponding to the type of a subject, template image, characteristic data for specifying a person, and the like) can be stored in the memory unit 4. Here, it is assumed that the CPU 3 has detected two people (player 501 and player 502) as subjects of the image of the scene shown in FIG. 7 through the subject detection processing, and also specified the detected people as a person C and a person A.

In a scene in which subjects at different distances are present together as shown in FIG. 7, it is difficult to bring all the subjects into focus, and therefore it is important to perform focus detection such that the subject intended by the user is brought into focus. Also, since the gazed area 503 is present in the vicinity of the boundary between the subjects in FIG. 7, it is difficult to specify the subject intended by the user from only the gazed area 503. Although it is conceivable to perform focusing control while prioritizing a closer subject, but the subject is not always a subject intended by the user.

In the present invention, using the result of subject detection processing performed on an image captured by the user, the camera automatically stores, for each user, the subject information related to the user in an associated manner. Also, when the focus detection area is to be set based on the gazed area, the subject information associated with the specific user recognized by means of the iris pattern is considered, and as a result, the probability that focus detection is performed on a main subject intended by the user is increased.

An example of the subject information, and an example of association between the user information and the subject information will be described using FIG. 8. The CPU 3 can register a code of an iris pattern when an iris pattern is acquired at the time of performing a calibration operation or the like to the memory unit 4 as the user information. Thereafter, the CPU 3 can specify a user through the line of sight detection operation when capturing is performed. Also, the CPU 3 stores the result of subject detection processing performed on a captured image to the memory unit 4 in association with the user information of the user who captured the image.

Here, the result of the subject detection processing is managed as subject information that is hierarchically structured by types of subjects (class or category) and specific subjects belonging to respective types. In FIG. 8, the thickness of lines connecting items of information indicates the strength of association between the items, and the thicker the line, the stronger the association between items.

At a point in time at which user information is registered, subject information associated with the user information is not present. Thereafter, when a user whose user information is registered performs capturing, the subject information is associated with the user information of the user based on the result of the subject detection processing performed on the capturing image. Also, when a new subject is captured, the CPU 3 generates characteristic information for recognizing the subject, and registers the characteristic information to the memory unit 4.

The CPU 3 compares the result of the subject detection processing with the subject information, and if it is determined that the type of the captured subject is the same as that of a subject that was captured before, or the same subject has been captured, the association in the user information is strengthened, with respect to items of the determined type or subject. The CPU 3 can manage association between user information and subject information by storing, to the memory unit 4, values representing the strengths (weights) of association with each user information, for each item in the subject information. Note that the association between items may be managed using another method.

Figure 8:
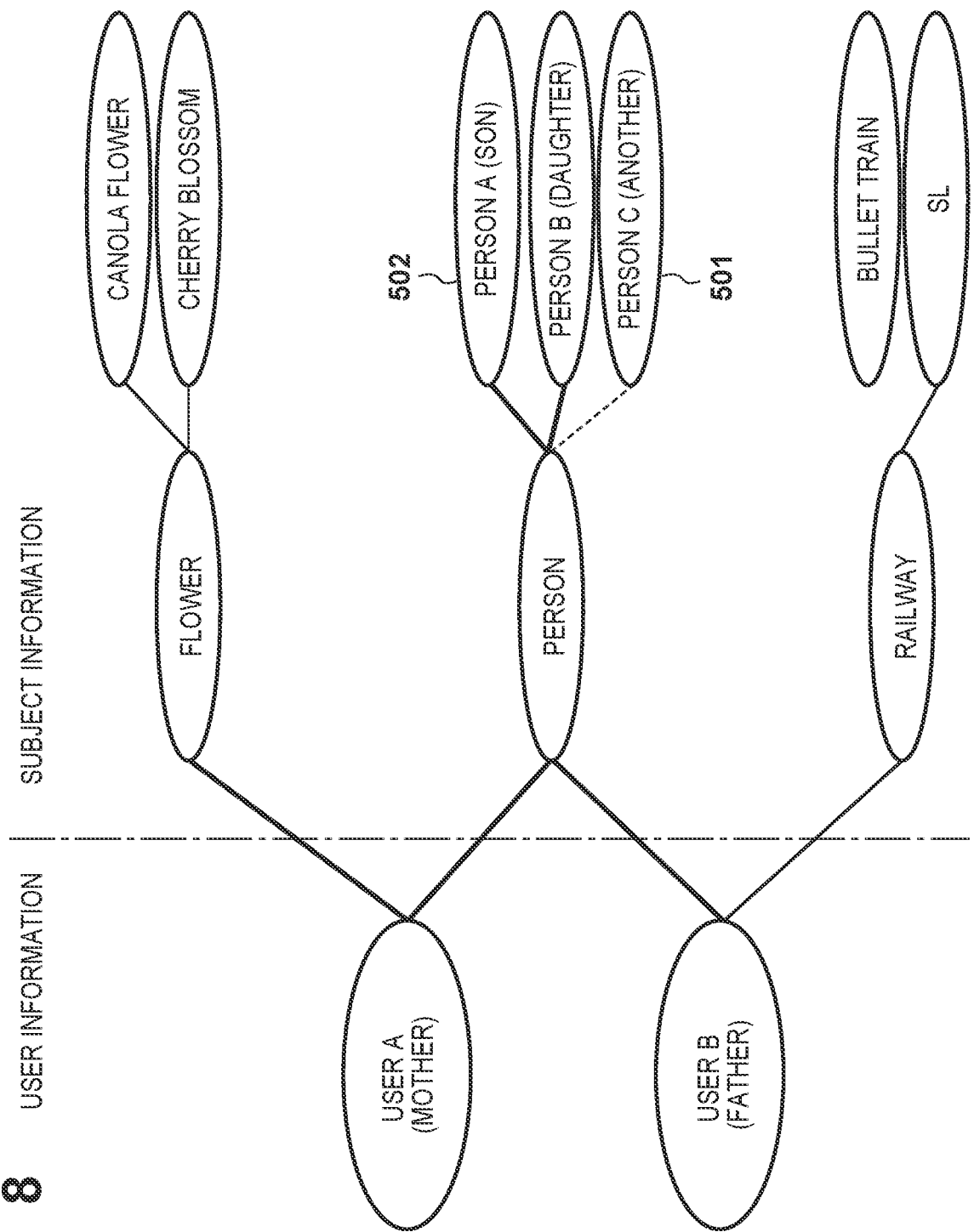
FIG. 8 is a diagram illustrating an exemplary configuration of association data in the embodiment.

In the example shown in FIG. 8, user information is registered regarding two users A and B. Here, one user is a mother, and the other is a father, but the camera registers the pieces of user information simply as two users A and B. Also, it can be understood that the user A has captured flowers and people at similar frequencies, and with respect to a person, a person A and a person B have been captured at a higher frequency than person C. In this way, in association information, the more captured frequency of a subject is, the stronger the association in subject information corresponding to the subject is (i.e., the weight for the information becomes larger). Note that, in order to simplify the drawing in FIG. 8, the association with each subject is illustrated as one line, but in actuality, the strengths of association are managed for each user. For example, the person A is captured by both the users A and B, but the strength of association with the user A and the strength of association with the user B are separately managed.

For example, in a scene shown in FIG. 7, it is assumed that the image is being captured by the user A and the player 501 is recognized as the person C (another), and the player 502 is recognized as the person A (son) in the subject detection processing. In this case, the CPU 3 regards a person (person A, here) whose association with the user A is stronger, of the items of persons A and C in the subject information, as the subject intended by the user A. In this way, as a result of using information regarding subjects captured by the user in the past, the possibility of properly selecting a subject that is highly possibly intended by an individual user can be increased.

Figure 9:
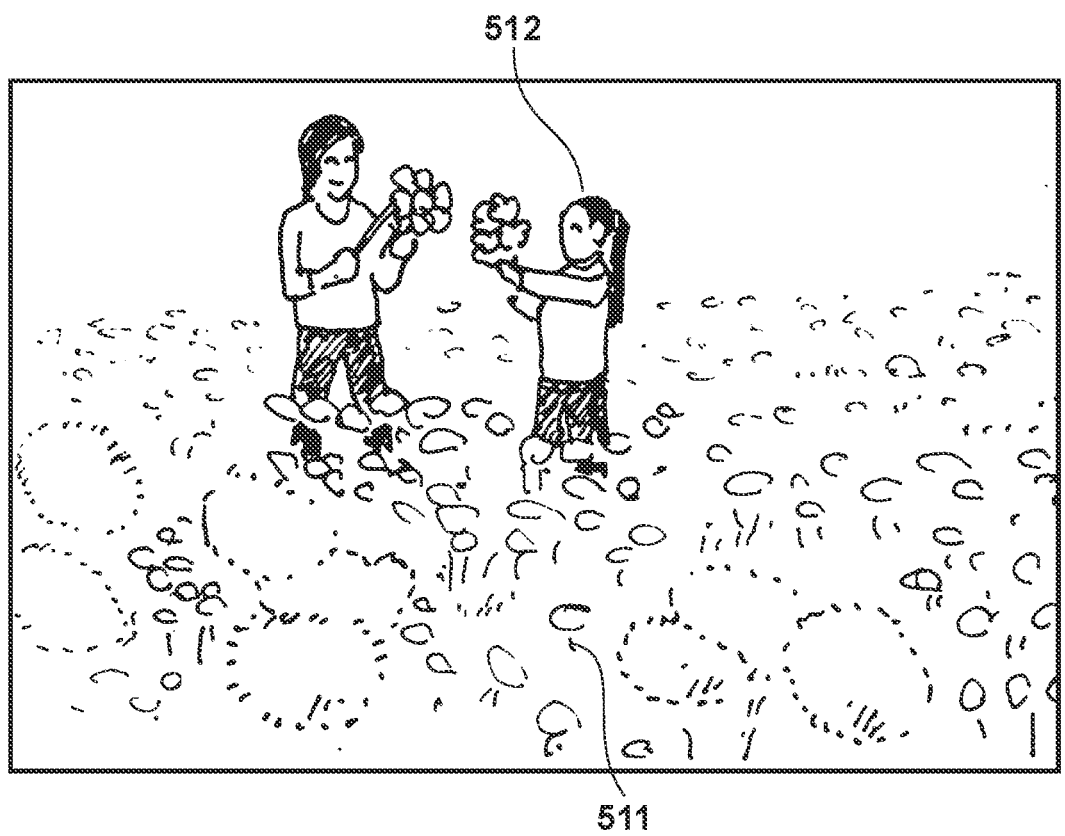
FIG. 9 is a diagram illustrating a subject selection operation in the embodiment.

An example of another capturing scene is shown in FIG. 9. When an area of people included in the scene is small in this way, which of a front flower 511 and a back person 512 is to be brought into focus is highly dependent on user intention. In this case as well, the possibility of selecting a subject that is intended by a user can be increased by referencing the subject information whose association with the user information is strong.

For example, if a user has captured people at a higher frequency than flowers, or the person 512 is a subject (family member or the like) that is captured frequently, the subject information regarding the "person" or the "person 512" is strongly associated with the user information than the "flower". Therefore, it is highly possible that selecting the person 512 as the subject matches the user intention. On the other hand, if the user has captured flowers at a higher frequency than people, or the person 512 is a person that has not been captured (another who is accidentally in the flower garden), the subject information regarding the "flower" is strongly associated with the user information than the "person" or the "person 512". Therefore, it is highly possible that selecting the flower 511 as the subject matches the user intention. Although the gazed area coordinates are not shown in FIG. 9, the subject that is ultimately selected may also be determined by further considering the gazed area coordinates. In this way, the support for subject selection using subject information unique to the user does not necessarily use the gazed area coordinates. Note that the eyeball image needs to be captured in order to specify the user.

According to the present embodiment, user recognition is performed by the user merely looking at the display device 10 arranged inside the main body 20, for example, and a state is entered in which a main subject is automatically selected based on information regarding main subjects captured by the user in the past. The CPU 3 can notify the user of an automatically selected main subject area by highlighting the indicator (FIGS. 3A to 3C) of a focus detection point corresponding to the selected main subject area, for example.

The subject selection operation using subject information according to the present embodiment will be described using the flowchart shown in FIG. 10. This operation can be started in a capturing stand-by state, for example.

In step S1002, the CPU 3 reads out association data for each user shown in FIG. 8 from a ROM in the memory unit 4, and stores the association data in a RAM. Note that association data may be read out, after a user is specified, regarding the specified user.

In step S1004, the CPU 3 starts operations for a live view (LV) display. Specifically, the CPU 3 starts a moving image capturing operation, a live view image generation operation, and a live view image display operation, and continuously executes these operations in parallel to the processing in step S1005 and onward. Accordingly, a live view image is displayed in the display device 10, and the user can confirm the capturing range of the camera by observing the display device 10 through the eyepiece lens 12.

In step S1005, the CPU 3 waits for SW1 of the shutter button to be turned on, and upon determining that SW1 is turned on, advances the processing to step S1006.

In step S1006, the CPU 3 generates a code of the iris pattern from an eyeball image, and confirms whether or not the user is a registered user by referencing the association data read out in step S1002 or the memory unit 4 (iris authentication). Note that the eyeball image may be acquired when the processing in step S1006 is executed, or acquired while the processing in steps S1004 to S1005 is executed.

In step S1007, the CPU 3 applies subject detection processing on the live view image, and acquires subject information. Here, processing for detecting areas of at least one predetermined type of subject (the "flower", "person", and "railway" in FIG. 8), and recognition processing (specification of "canola flower", "person A", "bullet train", and the like in the example in FIG. 8) regarding the detected subject are performed as the subject detection processing.

In step S1008, the CPU 3 determines whether or not at least one subject area has been detected by the subject detection processing, and advances the processing to step S1009 if the determination is affirmative, and advances the processing to step S1010 if not.

If a subject area has not been detected, the processing is advanced to step S1010. In this case, the CPU 3 selects an area that is most likely to be a subject as the main subject area based on contrast information of the live view image, and advances the processing to step S1013.

In step S1009, the CPU 3 advances the processing to step S1011 if it has been confirmed that the user is a registered user in step S1006, and advances the processing to step S1012 if not.

In step S1011, the CPU 3 selects, by referencing association data regarding the user, a subject area corresponding to an item of the subject information that is most strongly associated with the user, in subject information (subject type and/or recognized subject) obtained in the subject detection processing, as a main subject area. Then, the CPU 3 advances the processing to step S1013.

If subject detection was successful but the user was not confirmed as a registered user, the processing is advanced to step S1012. In this case, the CPU 3 selects an area where a main subject is present based on the subject information obtained in the subject detection processing. The CPU 3 can select a subject area that is closest to the center of a screen, the largest subject area, the closest subject area, or a subject area of a specific type (e.g., person), for example, but there is no limitation thereto. Then, the CPU 3 advances the processing to step S1013.

In step S1013, the CPU 3 configures a setting such that the main subject area selected in steps S1010 to S1012 is appropriately captured. For example, the CPU 3 can perform automatic exposure control for determining an exposure condition such that the main subject area is at a correct exposure level, and automatic focus detection in which the position of the movable lens 1a is adjusted such that the main subject area is brought into focus. Also, the CPU 3 may adjust the white balance with the main subject area being a reference. Also, image processing parameters for development processing may also be adjusted considering the type of the main subject. For example, if the main subject is a flower, the image processing parameters can be adjusted such that the reproducibility of flower color gamut is improved. Note that these are merely examples, and the main subject area or information obtained from the area can be used for another operation.

From this moment, if SW2 is turned on, the CPU 3 executes capturing processing for recording, processing for generating image data for recording, processing for recording the generated image data, and the like, based on the contents set in step S1013.

Modifications

Figure 10:
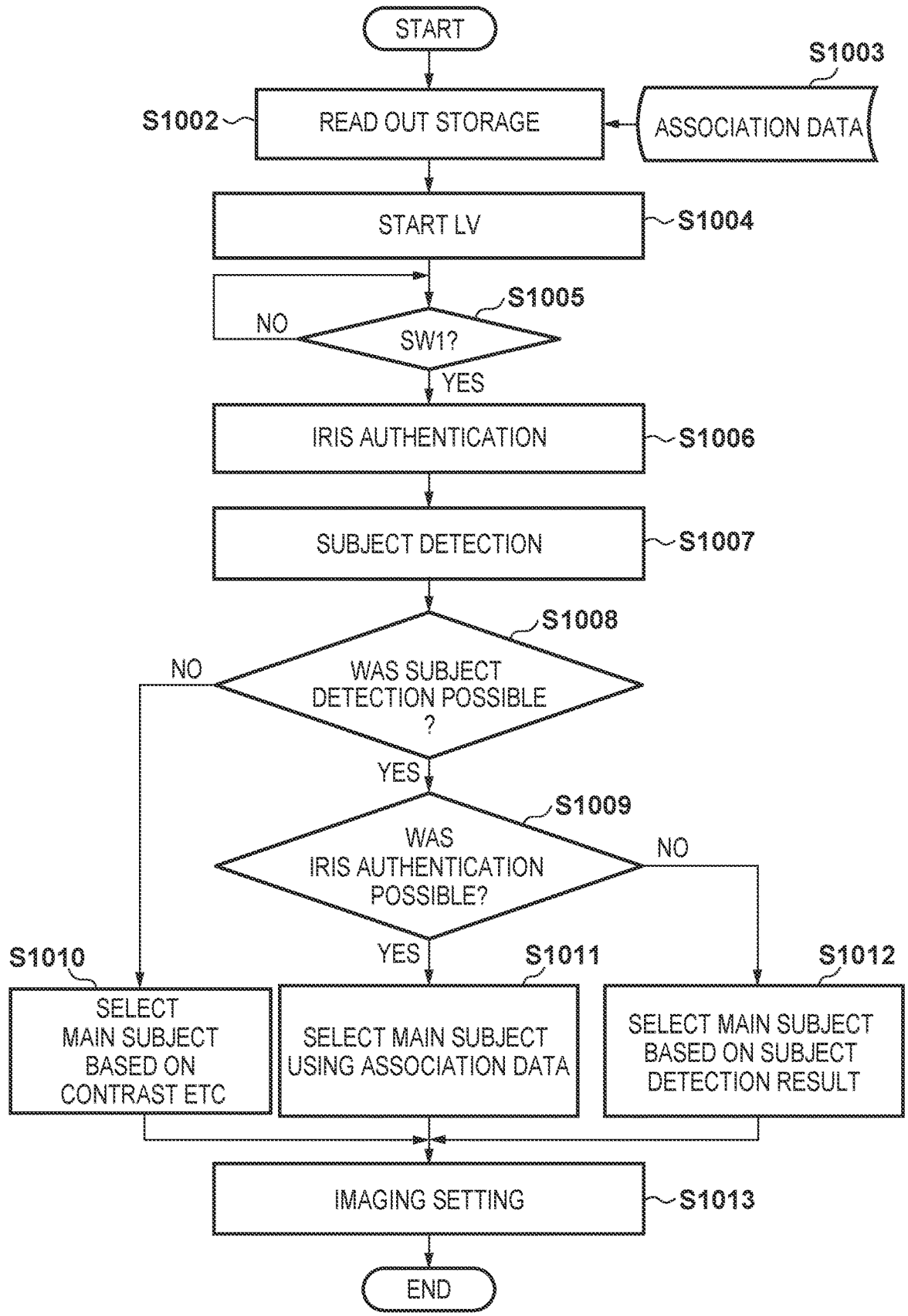
FIG. 10 is a flowchart relating to processing for selecting a main subject area in the embodiment.
Figure 11A:
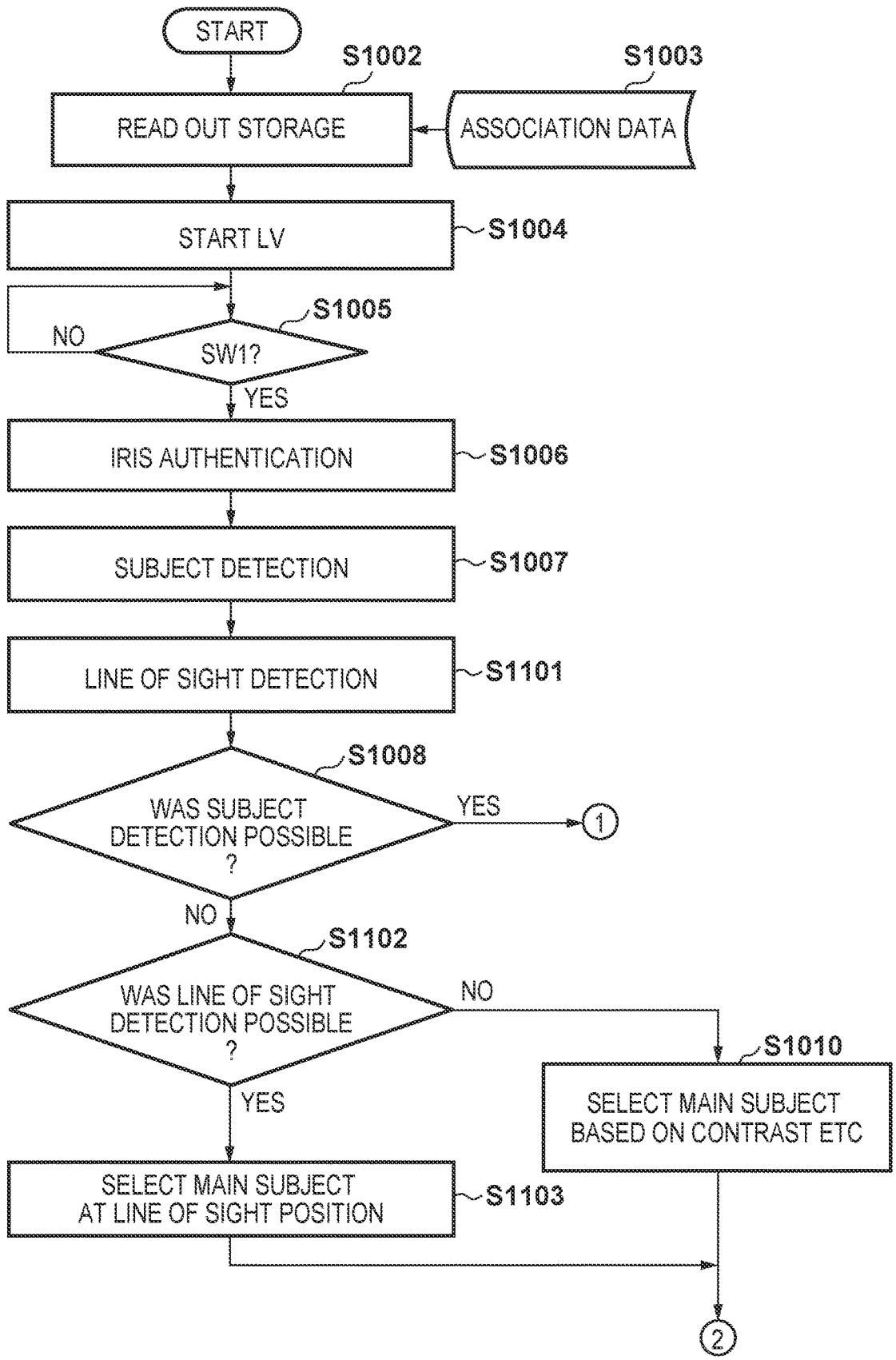
FIGS. 11A and 11B are flowcharts relating to processing for selecting a main subject area in a modification of the embodiment.
Figure 11B:
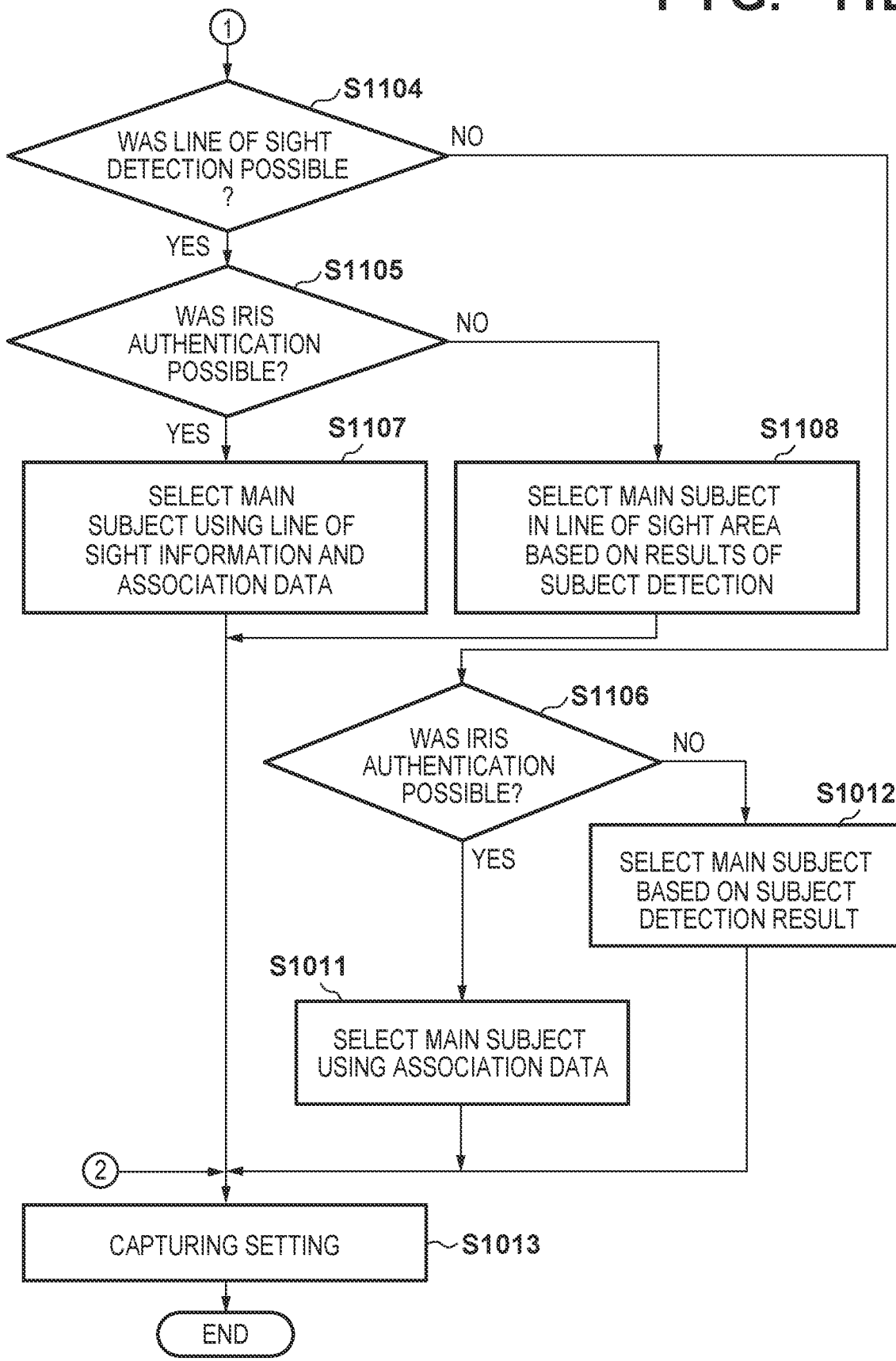

In the operations described in FIG. 10, a main subject area is selected without using gazed area coordinates. However, the gazed area coordinates may be considered. FIGS. 11A and 11B are flowcharts regarding operations for selecting a main subject using the gazed area coordinates. In FIGS. 11A and 11B, the steps in which operations similar to those in the case where the gazed area coordinates are not used are given the same reference numerals as those in FIG. 10, and redundant descriptions will be omitted.

In steps S1002 to S1007, the CPU 3 executes the same operations as those in FIG. 10.

In step S1101, the CPU 3 executes line of sight detection processing, and detects gazed area coordinates. The method of obtaining the gazed area coordinates from an eyeball image is as described above. The CPU 3 stores the gazed area coordinates in a RAM of the memory unit 4.

In step S1008, the CPU 3 determines whether or not at least one subject area has been detected by the subject detection processing, and advances the processing to step S1104 if the determination is affirmative, and to step S1102 if not.

In step S1102, the CPU 3 determines whether or not the gazed area coordinates have been obtained in step S1101, and advances the processing to step S1103 if the determination is affirmative, and to step S1010 if not.

If a subject area has not been detected, but the gazed area coordinates can be acquired, the processing is advanced to step S1103. In this case, the CPU 3 selects an area in which a main subject is present similarly to step S1010, in an area of a predetermined size including the gazed area coordinates, and advances the processing to step S1013.

In step S1104, the CPU 3 determines whether or not gazed area coordinates have been obtained in step S1101, and advances the processing to step S1105 if the determination is affirmative, and to step S1106 if not.

In step S1105, the CPU 3 advances the processing to step S1107 if it has been confirmed that the user is a registered user in step S1006, and to step S1108 if not.

In step S1107, the CPU 3 selects a main subject area based on the gazed area coordinates and association data regarding the user. For example, the CPU 3 selects, as the main subject area, a subject area, from subject areas close to the gazed area coordinates (are present in a distance less than a threshold value), that corresponds to an item of the subject information that is most strongly associated with the user in the association information. Alternatively, the CPU 3 selects, as the main subject area, a subject area that includes the gazed area coordinates (or is closest to the gazed area coordinates) from subject areas corresponding to the subject information included in the association data regarding the user. Then, the CPU 3 advances the processing to step S1013. As a result of utilizing the gazed area coordinates, the possibility (accuracy) of selecting the main subject area intended by the user can be increased, and because an area can be limited, computation speed can also be increased.

If a subject area has been detected and gazed area coordinates have been obtained, but the user is not confirmed as a registered user (failed in iris authentication), the processing is advanced to step S1108. In this case, the CPU 3 selects a subject area that is present in a predetermined range including the gazed area coordinates, as an area in which a main subject is present.

In step S1106, the CPU 3 advances the processing to step S1011 if it has been confirmed that the user is a registered user in step S1006, and to step S1012 if not.

Association Information Updating Processing

Figure 12:
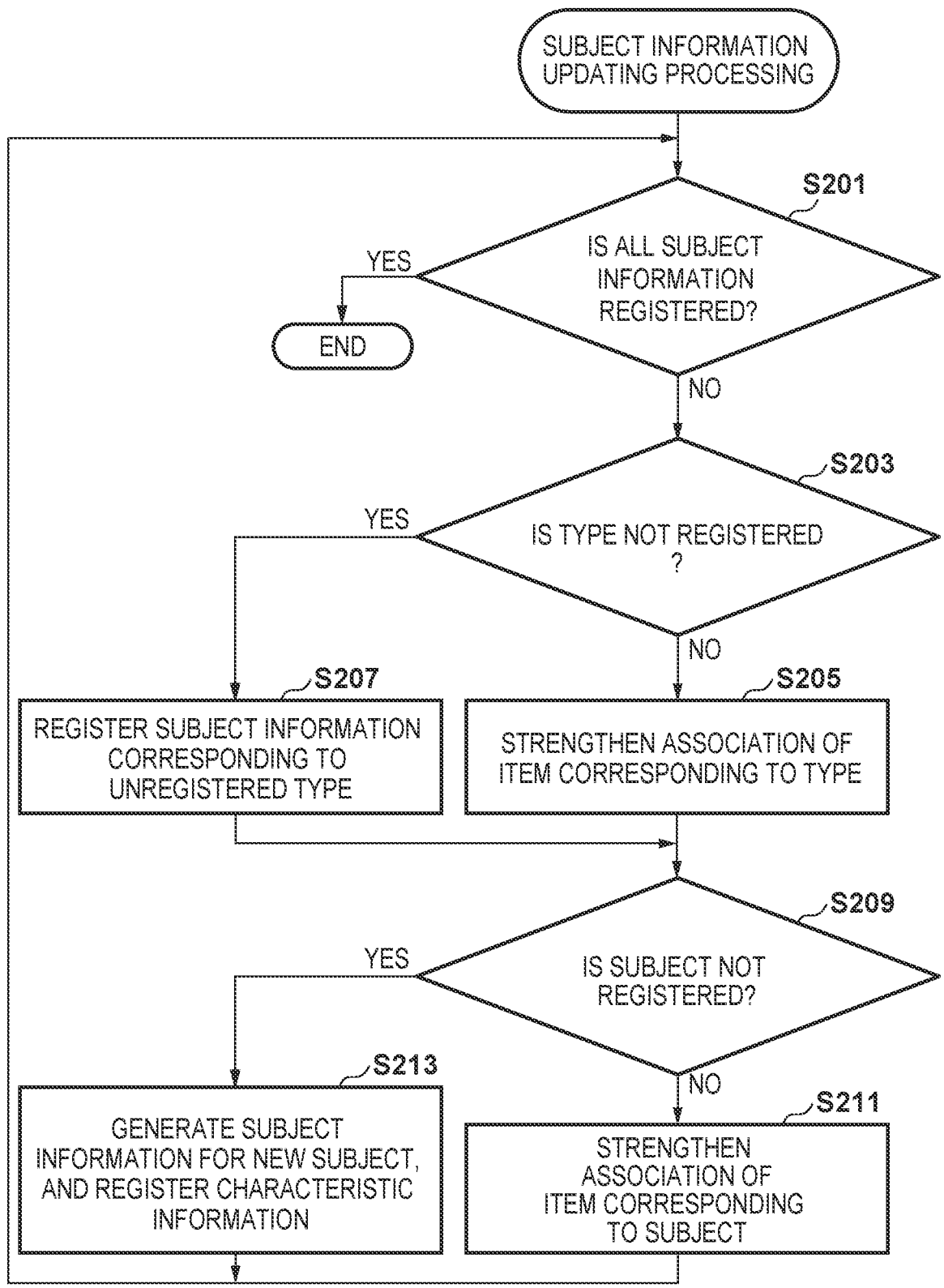
FIG. 12 is a flowchart relating to processing for updating association data in the embodiment.

As described above, the CPU 3 performs subject detection processing on a captured image according to user's instruction, and updates the association data regarding the user based on the result of the processing. The updating processing of the association information will be described using the flowchart shown in FIG. 12. The updating processing may be performed immediately after the processing from capturing for recording to recording image data has been completed, or at any timing after recording is completed. Note that the updating processing of the association data is executed when the user is confirmed to be a registered user (succeeded in iris authentication), and a subject area is detected in the subject detection processing.

In step S201, the CPU 3 determines whether or not association data is updated with respect to all of the subject areas detected in the subject detection processing performed in step S1007 in FIG. 10 or 11. The CPU 3 ends the processing if the determination is affirmative, and advances the processing to step S203 if not.

In step S203, the CPU 3 determines whether or not the subject area to be updated is an area regarding a subject of a type that is not registered in the association data regarding the user. The CPU 3 advances the processing to step S207 if it is determined to be a subject of an unregistered type, and to step S205 if not.

In step S205, the CPU 3 strengthens an association, by a predetermined amount, regarding the item of the subject information that is registered in the association data regarding the user, that corresponds to the type of the subject area to be updated, and thereafter advances the processing to step S209.

In step S207, the CPU 3 adds an item of subject information corresponding to the type of the subject area to be updated to the association data regarding the user, and thereafter advances the processing to step S209.

In step S209, the CPU 3 determines whether or not the subject area to be updated is an area regarding a subject that is not registered in the association data regarding the user. The CPU 3 advances the processing to step S213 if it is determined to be an unregistered subject, and to step S211 if not.

In step S211, the CPU 3 strengthens, by a predetermined amount, the association regarding the item of the subject information registered in the association data regarding the user, that corresponds to the subject recognized in the subject area to be updated, and thereafter returns the processing to step S201.

In step S213, the CPU 3 adds the item of the subject information corresponding to the subject recognized in the subject area to be updated to the association data regarding the user, and thereafter returns the processing to step S201. Note that the CPU 3 generates characteristic information from the subject area such that the subject can be recognized in images to be subsequently captured, and also registers the characteristic information.

As described above, according to the present embodiment, the result of subject detection performed on an image captured in the past is stored in association with a user, and the stored result is utilized when a main subject area is selected. Therefore, the possibility of selecting a main subject that is highly possibly intended by the user who was recognized using a line of sight detection function can be increased. As described above, an image capture apparatus that can support selection of a main subject using a result of recognizing a user using the line of sight detection function, and the control method thereof can be provided.

Other Embodiments

In the embodiment described above, an eyeball image was captured using a configuration in which a user looks at the display device 10 provided inside the main body of a camera through the eyepiece lens 12. However, the present invention can also be applied to a configuration in which an eyeball image of a user who looks at a display device provided on a surface of a camera main body is captured.

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-149407, filed on Aug. 16, 2019, which is hereby incorporated by reference herein in its entirety.

What is claimed is:

1. An image capture apparatus capable of capturing a first image in a first direction while capturing a second in a second direction different from the first direction, the image capture apparatus comprising:
one or more processors, when executing a program stored in a memory, function as:
a recognition unit configured to recognize a user who is operating the image capture apparatus while looking into a display unit that displays the first image, from an eyeball image included in the second image, wherein the display unit is provided on an outer surface of the image capture apparatus;
a selection unit configured to select a main subject area from among subject areas detected in the first image, based on information regarding subjects being stored in association with the recognized user; and
a notification unit configured to notify the user operating the image capture apparatus of the main subject area through the display unit,
wherein the image capture apparatus captures the first image and the second image using different image sensors.

2. The image capture apparatus according to claim 1, wherein:
the recognition unit further recognizes subjects corresponding to subject areas detected in the first image; and
the selection unit is configured to select, as the main subject area, one of the subject areas detected in the first image that corresponds to a subject corresponding to the information regarding subjects.

3. The image capture apparatus according to claim 1, wherein the one or more processors further function as a line of sight detection unit configured to detect a position in a visual field of the image capture apparatus at which the user gazes based on the eyeball image of the user.

4. The image capture apparatus according to claim 3, wherein the selection unit is configured to select the main subject area by considering the position detected by the line of sight detection unit in addition to the information regarding subjects stored being associated with the recognized user.

5. The image capture apparatus according to claim 3, wherein the selection unit is configured to select the main subject area, based on the information regarding subjects stored being associated with the recognized user, from among subject areas that are detected in the first image and are present at distances less than a threshold value from the position detected by the line of sight detection unit.

6. The image capture apparatus according to claim 3, wherein the selection unit is configured to select, from among subject areas that are detected in the first image and are corresponding to the information regarding subjects stored being associated with the recognized user, the main subject area based on the position detected by the line of sight detection unit.

7. The image capture apparatus according to claim 1, wherein each piece of the information regarding subjects stored being associated with the recognized user is weighted such that the more frequent a respective subject was captured in the past, the larger the weight is.

8. The image capture apparatus according to claim 1, wherein the one or more processors further function as: an update unit configured to update the information regarding subjects being stored in association with the user, based on subject areas detected in the first image captured according to an instruction made by the user.

9. The image capture apparatus according to claim 1, wherein the one or more processors further function as a control unit configured to perform at least one of focus detection, exposure control, and setting of image processing on the first image, based on the main subject area selected by the selection unit.

10. The image capture apparatus according to claim 1, wherein the recognition unit recognizes the user based on an iris pattern obtained from the eyeball image.

11. The image capture apparatus according to claim 1, wherein the selection unit configured to select the main subject area from among the subject areas detected in the first image that is captured in response to an instruction made by the user, based on the information regarding subjects being stored in association with the recognized user.

12. A control method of an image capture apparatus, wherein the image capture apparatus is capable of capturing a first image in a first direction while capturing a second image in a second direction different from the first direction, the control method comprising:
recognizing a user who is operating the image capture apparatus while looking into a display unit that displays the first image, from an eyeball image included in the second image, wherein the display unit is provided on an outer surface of the image capture apparatus;

selecting a main subject area from among subject areas detected in the first image, based on information regarding subjects being stored in association with the recognized user; and notifying the user operating the image capture apparatus of the main subject area through the display unit, wherein the image capture apparatus captures the first image and the second image using different image sensors.

13. A non-transitory computer-readable medium storing a program for causing a computer, which is included in an image capture apparatus that is capable of capturing a first image in a first direction while capturing a second image in a second direction different from the first direction, to function as:

a recognition unit configured to recognize a user who is operating the image capture apparatus while looking into a display unit that displays the first image, from an eyeball image included in the second image, wherein the display unit is provided on an outer surface of the image capture apparatus;

a selection unit configured to select a main subject area from among subject areas detected in the first image, based on information regarding subjects being stored in association with the recognized user; and a notification unit configured to notify the user operating the image capture apparatus of the main subject area through the display unit, wherein the image capture apparatus captures the first image and the second image using different image sensors.

* * * * *